US010807080B2

(12) United States Patent
Chen et al.

(10) Patent No.: US 10,807,080 B2
(45) Date of Patent: Oct. 20, 2020

(54) SYNTHESIS OF METAL PROMOTED ZEOLITE CATALYST

(71) Applicant: Johnson Matthey Public Limited Company, London (GB)

(72) Inventors: Hai-Ying Chen, Wayne, PA (US); Joseph Fedeyko, Wayne, PA (US); Raul Lobo, Newark, DE (US); Trong Pham, Wayne, PA (US)

(73) Assignee: Johnson Matthey Public Limited Company, London (GB)

( * ) Notice: Subject to any disclaimer, the term of this patent is extended or adjusted under 35 U.S.C. 154(b) by 209 days.

(21) Appl. No.: 15/717,995

(22) Filed: Sep. 28, 2017

(65) Prior Publication Data
US 2018/0093258 A1   Apr. 5, 2018

Related U.S. Application Data

(60) Provisional application No. 62/402,723, filed on Sep. 30, 2016.

(51) Int. Cl.
| | |
|---|---|
| *C01B 39/48* | (2006.01) |
| *C01B 39/30* | (2006.01) |
| *C01B 39/24* | (2006.01) |
| *C01B 39/14* | (2006.01) |
| *B01J 29/70* | (2006.01) |
| *B01J 29/76* | (2006.01) |
| *B01J 29/56* | (2006.01) |
| *B01D 53/94* | (2006.01) |
| *C01B 39/02* | (2006.01) |
| *B01J 29/14* | (2006.01) |
| *B01J 29/072* | (2006.01) |
| *C01B 39/18* | (2006.01) |
| *B01J 37/00* | (2006.01) |
| *B01J 37/04* | (2006.01) |
| *B01J 37/10* | (2006.01) |
| *B01J 37/30* | (2006.01) |
| *F01N 3/10* | (2006.01) |

(52) U.S. Cl.
CPC ............ *B01J 29/763* (2013.01); *B01D 53/94* (2013.01); *B01D 53/9413* (2013.01); *B01J 29/072* (2013.01); *B01J 29/146* (2013.01); *B01J 29/56* (2013.01); *B01J 29/70* (2013.01); *B01J 29/76* (2013.01); *B01J 29/7607* (2013.01); *B01J 37/0018* (2013.01); *B01J 37/04* (2013.01); *B01J 37/10* (2013.01); *B01J 37/30* (2013.01); *C01B 39/026* (2013.01); *C01B 39/145* (2013.01); *C01B 39/18* (2013.01); *C01B 39/24* (2013.01); *C01B 39/305* (2013.01); *C01B 39/48* (2013.01); *B01D 53/9418* (2013.01); *B01D 2255/20738* (2013.01); *B01D 2255/20761* (2013.01); *B01D 2255/50* (2013.01); *B01D 2255/9205* (2013.01); *B01D 2258/012* (2013.01); *C01P 2002/72* (2013.01); *C01P 2004/03* (2013.01); *F01N 3/10* (2013.01); *F01N 2370/04* (2013.01); *F01N 2570/14* (2013.01); *F01N 2570/18* (2013.01)

(58) Field of Classification Search
CPC ....... C01B 39/48; C01B 39/305; C01B 39/24; C01B 39/026; C01B 39/145; C01B 39/18; B01J 39/072; B01J 39/146; B01J 39/56; B01J 39/70; B01J 39/7607; B01J 39/763; B01J 37/10; B01J 39/76; B01D 53/9418
See application file for complete search history.

(56) References Cited

U.S. PATENT DOCUMENTS

| | | | |
|---|---|---|---|
| 8,057,768 B2 | 11/2011 | Schneider et al. | |
| 8,652,429 B2 | 2/2014 | Sumiya et al. | |
| 9,480,976 B2* | 11/2016 | Rivas-Cardona | ............................ B01D 53/9418 |
| 2008/0127638 A1 | 6/2008 | Vaarkamp et al. | |
| 2014/0271426 A1 | 9/2014 | Casci et al. | |
| 2015/0367336 A1 | 12/2015 | Trukhan et al. | |
| 2016/0023913 A1* | 1/2016 | Goel | .......... B01J 29/40 423/709 |
| 2016/0096169 A1 | 4/2016 | Rivas-Cardona et al. | |
| 2017/0259250 A1* | 9/2017 | Tanaka | ..................... B01J 29/70 |
| 2018/0346341 A1* | 12/2018 | Martin Garcia | ..... B01J 37/0246 |

FOREIGN PATENT DOCUMENTS

| | | |
|---|---|---|
| GB | 2478638 A | 9/2011 |
| JP | 2006075748 A | 3/2006 |
| WO | 2010118125 A2 | 10/2010 |
| WO | 2012075400 A1 | 6/2012 |
| WO | 2012156883 A1 | 11/2012 |
| WO | 2015084817 A1 | 6/2015 |
| WO | 2015084834 A1 | 6/2015 |
| WO | 2015100822 A1 | 7/2015 |
| WO | 2016014691 A1 | 1/2016 |
| WO | 2016077667 A1 | 5/2016 |

OTHER PUBLICATIONS

Yang et al.; Heterometal Incorporation in Metal-Exchanged Zeolites Enables Low-Temperature Catalytic Activity of NOx Reduction; dx.doi.org/10.1021/jp3056043 | J. Phys. Chem. C 2012, 116, 23322-23331.

Xiaofan Yang et al Heteromental Incorporation in Metal-Exhanged Zeolites Enables Low-Temperature Catalytic Activity of NOx Reduction Journal of Physical Chemistry C, vol. 116, No. 44 Nov. 8, 2012, pp. 23322-23331, XP05539171.

\* cited by examiner

*Primary Examiner* — David M Brunsman (57) ABSTRACT

Provided are a novel synthesis technique for producing a metal promoted aluminosilicate zeolite having a small pore framework comprising the step of reacting a synthesis gel comprising at least one promoter metal containing zeolite, a structure directing agent and an optional additional silica source; and methods of using the same.

13 Claims, 4 Drawing Sheets

SYNTHESIS OF METAL PROMOTED ZEOLITE CATALYST

CROSS REFERENCE TO RELATED APPLICATIONS

This application claims priority to U.S. Provisional Application No. 62/402,723, filed Sep. 30, 2016.

FIELD OF THE INVENTION

The present invention relates to methods of synthesizing metal promoted aluminosilicate zeolite catalysts having a small pore framework and to the use of such catalysts for treating combustion exhaust gas.

BACKGROUND OF THE INVENTION

Zeolites are molecular sieves having unique lattice frameworks constructed of alumina and silica cages. The Internal Zeolite Association (IZA) assigns each unique framework type a three-letter code, such as MOR, CHA, or BEA.

Synthesis of zeolite crystals typically involves reacting alumina and silica in the presence of an organic template (also referred to as a structure directing agent or SDA; similarly, SDA cations can be referred to as SDA') at elevated temperatures for several days. During crystallization, the alumina and silica co-join to form a crystalline structure around the SDA. The reactants, reaction conditions, and the species of SDA all impact which type or types of framework that are synthesized. When sufficient crystallization has occurred, the crystals are removed from the mother liquor and dried. After the crystals are separated from the mother liquor, the organic SDA is thermally degraded and removed from the crystalline structure, thus leaving a porous molecular sieve.

Zeolites have numerous industrial applications including internal combustion engines, gas turbines, coal-fired power plants, and the like. In one example, nitrogen oxides ($NO_x$) in the exhaust gas can be controlled through a so-called selective catalytic reduction (SCR) process whereby $NO_x$ compounds in the exhaust gas are contacted with a reducing agent in the presence of a zeolite catalyst.

ZSM-5 (MFI medium pore) and Beta zeolites (large pore) have been studied as SCR catalysts due to their relatively wide temperature activity window. However, the relatively large pore structures of these zeolites have a number of drawbacks. First, they are susceptible to high temperature hydrothermal degradation resulting in a loss of activity. Also, large and medium pore sizes tend to adsorb hydrocarbons which are oxidized as the temperature of the catalyst increases, thus generating a significant exotherm which can thermally damage the catalyst. This problem is particularly acute in lean-burn systems, such as vehicular diesel engines, where significant quantities of hydrocarbon can be adsorbed during cold-start. Coking by hydrocarbons presents another significant drawback of these large and medium pore molecular sieve catalysts. In contrast, small pore molecular sieve materials, such as those having an AEI, AFX, or CHA framework, offer an improvement in that fewer hydrocarbons are able to permeate into the framework.

To promote the catalytic reaction, promoter metals (e.g., transition metals) be included in the zeolite material, either as a substituted framework metal (commonly referred to as "metal-substituted zeolite") or as a post-synthesis ion exchanged or impregnated metal (commonly referred to as "metal-exchanged zeolite"). As used herein, the term "post-synthesis" means subsequent to zeolite crystallization. The typical process for incorporating a transition metal into a zeolite is by cationic exchange or impregnation of metals or precursors after the molecular sieve is formed. However, these exchange and impregnation processes for incorporating metals frequently lead to poor uniformity of metal distribution, particularly when exchanged into small pore molecular sieve.

Metal (e.g., Cu and/or Fe) exchanged small pore zeolite catalysts consistently show high $NO_x$ conversion under SCR conditions and durability to high temperatures. Selectivity for these small pore zeolite catalysts is significantly improved relative to medium and large pore zeolites; but with the implementation of future regulations, the reduction of $N_2O$ formation over these catalysts has become a crucial development objective. Selectivity is the ability of a particular catalyst to favor the formation of desirable products rather than the undesirable products. Additionally, the processes involved in the exchange of Metal (e.g., Cu and/or Fe) can add multiple processing steps, require the addition of components to the final washcoat, or impact the final processing of the catalyst washcoat.

The formation of Cu-CHA and Cu-AEI in the past has shown the benefits of incorporating Cu during the synthesis of the zeolite particularly for improving the selectivity of the fresh catalysts. However, the synthesis of Cu incorporated zeolites is particularly challenged by the incorporation process. Typically, these materials require the addition of a secondary organic molecule to act as a carrier for the Cu and ensure incorporation of the extra-framework Cu during the synthesis. E.g., see WO2015/084817A1 and WO2015/084834A1. These molecules are not always fully capable of capturing all Cu during the addition process often resulting in poor fresh lightoff. Thus, there is still a need to improve the zeolite synthesis mixture (e.g., reducing the additional organic components) while still maintaining the performance benefits.

SUMMARY OF THE INVENTION

Through intensive research and studies, the inventors have discovered a novel zeolite synthesis technique. Accordingly, one aspect of the present invention is directed to a method of synthesizing a metal promoted aluminosilicate zeolite catalyst having a small pore framework comprising the step of reacting a synthesis gel comprising at least one promoter metal containing zeolite, a structure directing agent, and an optional additional silica source at a temperature of at least about 100° C. until crystals of the small pore framework zeolite catalyst form.

Another aspect of the present invention is directed to a method of synthesizing a metal promoted aluminosilicate zeolite catalyst having a small pore framework comprising the step of reacting a synthesis gel comprising a promoter metal source, at least one zeolite, a structure directing agent, and an optional additional silica source at a temperature of at least about 100° C. until crystals of the small pore framework zeolite catalyst form.

In addition, provided is a catalyst for treating an exhaust gas comprising a pure-phase aluminosilicate zeolite loaded with a metal selected from V, Cr, Mn, Fe, Co, Ni, Cu, Zn, Mo, Ru, Rh, Pd, Ag, W, Re, Os, Ir, Pt, and Au.

Also provided is a method for using such a catalyst to treat an exhaust gas, for example by selectively reducing $NO_x$, by storing $NO_x$, or by oxidizing one or more of CO, hydrocarbons, and NH$_3$. Such catalyst is preferably supported on a wall-flow filter or a honeycomb flow-through support.

DETAILED DESCRIPTION OF THE INVENTION

One aspect of the present invention is directed to a method of synthesizing a metal promoted aluminosilicate zeolite catalyst having a small pore framework comprising the step of reacting a synthesis gel comprising at least one promoter metal containing zeolite, a structure directing agent, and an optional additional silica source at a temperature of at least about 100° C. until crystals of the small pore framework zeolite catalyst form. The zeolite in the synthesis gel is a source of both silica and alumina in the synthesis of the metal promoted aluminosilicate zeolite catalyst having a small pore framework.

The term "zeolite" refers to an aluminosilicate molecular sieve having a framework composed primarily of alumina and silica moieties, and thus does not include other isotypes such as SAPOs, AlPOs, and the like.

Examples of suitable additional silica sources include, but are not limited to, silica powders such as Cabosil M5, and tetraalkyl silicates such as tetraethyl orthosilicate (TEOS).

The framework zeolite crystals of the method above can be at least about 90% phase pure.

As used herein, the term "percent" in connection with the zeolite framework means:

percent crystallinity=$I_{crystalline}/(I_{crystalline}+I_{amorphous})$
($I$=intensity).

The impurities can be amorphous, different crystalline phases, or different framework types (e.g., undissolved faujasite, ITE, and/or MOR).

The aluminosilicate zeolite can contain at least about 95 percent, or even at least about 97 percent of the framework crystallinity. The aluminosilicate zeolite can also be substantially free of other crystalline phases. Typically, it is not an intergrowth of two or more framework types. As used herein, the term "substantially free" means that the zeolite contains less than about 10, 8, 6, 4, 2, or 1 percent of the names framework impurity.

As used herein, the ten "large pore" means a framework having a maximum ring size of at least 12 tetrahedral atoms, "medium pore" means a framework having a maximum ring size of at least 10 tetrahedral atoms, and the term "small pore" means a framework having a maximum ring size of at least 8 tetrahedral atoms.

Examples of suitable small pore zeolites include, but are not limited to, AEI, CHA, AFX, EAB, KFI, LEV, RTH, SFW, LTA, and ERI. The small pore zeolite can be selected from the group consisting of AEI, CHA, AFX, EAB, KFI, LEV, and LTA. Preferably, the small pore zeolite can be selected from the group consisting of AFX, AEI, and CHA. The small pore zeolite can be CHA. The small pore zeolite can be AEI. The small pore zeolite can be AFX.

As used herein, the terms "AEI", "AFX," and "CHA" refer to AEI, AFX, and CHA framework types, respectively, as recognized by the International Zeolite Association (IZA) Structure Commission.

Zeolite crystals made using the methods described above can also have a silica-to-alumina mole ratio (SAR) of at least about 15, 20, 22, 25, or 30.

The SAR is based on the synthesized zeolite catalyst crystal and not the starting synthesis gel. The silica-to-alumina ratio of zeolites can be determined by conventional analysis. This ratio is meant to represent, as closely as possible, the ratio in the rigid atomic framework of the zeolite crystal and to exclude silicon or aluminum in the binder or in cationic or other form within the channels. Since it can be difficult to directly measure the silica to alumina ratio of zeolite after it has been combined with a binder material, particularly an alumina binder, these silica-to-alumina ratios are expressed in terms of the SAR of the zeolite per se, i.e., prior to the combination of the zeolite with the other catalyst components.

Zeolite crystals made by the methods described above can be Cu-AFX, Cu-CHA, or Cu-AEI. The Cu-AFX, Cu-CHA, or Cu-AEI catalyst can have an SAR of about 10 to about 40, or about 16 to about 40.

Cu can be present in the small pore zeolite catalyst at a concentration of up to about 4, 3, 2, or 1 weight percent (wt %) based on the total weight of Cu-AFX catalyst.

The promoter metal containing zeolite of the methods described above can be obtained by ion-exchange and/or impregnation methods.

The promoter metal can be any of the recognized catalytically active metals that are used in the catalyst industry to form metal containing zeolites, particularly those metals that are known to be catalytically active for treating exhaust gases derived from a combustion process. Particularly preferred are metals useful in NO$_x$ reduction and storage processes. The promoter metal can include: (a) transition metals, such as copper, nickel, zinc, iron, tungsten, molybdenum, cobalt, titanium, zirconium, manganese, chromium, vanadium, niobium, tin, bismuth, and antimony; (b) platinum group metals, such as ruthenium, rhodium, palladium, indium, and platinum, and (c) precious metals, such as gold and silver. Preferred transition metals are base metals, and preferred base metals include those selected from the group consisting of chromium, manganese, iron, cobalt, nickel, and copper, and mixtures thereof. Preferably, at least one of the promoter metals is copper. Other preferred promoter metals include iron, particularly in combination with copper.

The promoter metal containing zeolite can comprise a zeolite having an FAU, BEA or GME framework. Zeolite Y has an FAU template. The zeolite in the promoter metal containing zeolite can be a zeolite in an ammonium-form or hydrogen-form (e.g., NH$_4$-form zeolite Y, H-form zeolite Y). Examples of the zeolites include, but are not limited to, zeolite Y (e.g., CBV500, CBV712, CBV720, CBV760).

Typically, the promoter metal containing zeolite Y has a SAR of about 5 to about 60. Alternatively, the SAR is at least about 20, 30, 40, or 50.

Examples of suitable promoter metal containing zeolites include, but are not limited to, Cu-Zeolite Y, Fe-Zeolite Y, Cu-CBV500, Cu-CBV712, Cu-CBV720, Cu-CBV760, and Fe-CBV712.

Alternatively, the at least one zeolite in the reaction mixture can have a lower framework density than the aluminosilicate zeolite product. The framework density is defined as the number of tetrahedral atoms per 1,000 Å$^3$.

The promoter metal can be present in an amount relative to the amount of aluminum in the zeolite, namely the framework aluminum. As used herein, the promoter metal: aluminum (M:Al) ratio is based on the relative molar amount of promoter metal to molar framework Al in the corresponding zeolite. Typically, the promoter metal containing zeolite has a M:Al ratio of about 0.1 to about 1.0, preferably about 0.2 to about 0.5.

An M:Al ratio of about 0.2 to about 0.5 is particularly useful where M is copper, and more particularly where M is copper and the SiO$_2$/Al$_2$O$_3$ of the synthesis gel is about 20 to about 100, about 40 to about 60, or about 60 to about 90.

Post-synthesis, the additional promoter metal can be disposed on and/or within the small pore zeolite catalyst as extra-framework metals. As used herein, an "extra-framework metal" is one that resides within the molecular sieve and/or on at least a portion of the molecular sieve surface, preferably as an ionic species, does not include aluminum, and does not include atoms constituting the framework of the molecular sieve. Preferably, the presence of the promoter metal(s) facilitates the treatment of exhaust gases, such as exhaust gas from a diesel engine, including processes such as NO$_x$ reduction, NH$_3$ oxidation, and NO$_x$ storage.

The extra-framework metal can be added to the molecular sieve via any known technique such as ion exchange, impregnation, isomorphous substitution, etc. Extra-framework metals can be of any of the recognized catalytically active metals that are used in the catalyst industry to form metal-exchanged molecular sieves.

The promoter metal can be present in the small pore zeolite catalyst at a concentration of about 0.1 to about 10 weight percent (wt %) based on the total weight of the zeolite catalyst, for example from about 0.5 wt % to about 5 wt %, from about 1 to about 5 wt %, about 2.5 wt % to about 3.5 wt %. Alternatively, the promoter metal can be present in the small pore zeolite catalyst at a concentration of about 3 wt % to about 3.5 wt % from about 0.5 to about 1 wt %.

When the promoter metal is copper, iron, or the combination thereof, the concentration of these transition metals in the small pore zeolite catalyst is preferably about 1 to about 5 weight percent, more preferably about 2.5 to about 3.5 weight percent.

The promoter metal, such as copper, can be present in an amount from about 80 to about 120 g/ft$^3$ of the small pore zeolite catalyst or a washcoat loading of about 85 to about 95 g/ft$^3$, or about 90 to about 95 g/ft$^3$.

The promoter metal can be present in an amount relative to the amount of aluminum in the small pore zeolite catalyst, namely the framework aluminum. Typically, the small pore zeolite catalyst material has a M:Al ratio of about 0.1 to about 1.0, preferably about 0.2 to about 0.5. An M:Al ratio of about 0.2 to about 0.5 is particularly useful where M is copper, and more particularly where M is copper and the SAR of the zeolite is about 15 to about 40, about 15 to about 35, or about 16 to about 32.

The small pore zeolite catalysts can be preferably prepared with an organic SDA. Examples of suitable organic SDA cations include, but are not limited to, 1,3-bis(1-adamantyl)imidazolium, N,N-diethyl-cis 2,6-dimethylpiperidium, N,N-dimethyl-3,5-dimethylpiperidium, pentamethylimidazolium, 1,2-dimethyl-3-(4-methylbenzyl) imidazolium, N,N,N-1-trimethyladamantammonium, and N,N,N-dimethylethylcyclohexylammonium. Preferably the SDA cation is selected from the group consisting of 1,3-bis (1-adamantyl)imidazolium, N,N-diethyl-cis 2,6-dimethylpiperidium, N,N,N-1-trimethyladamantammonium, and N,N,N-dimethylethylcyclohexylammonium. More preferably, the SDA cation is 1,3-bis(1-adamantyl)imidazolium. Alternatively, the SDA is N,N-diethyl-cis 2,6-dimethylpiperidium or N,N-dimethyl-3,5-dimethylpiperidium. The SDA cation can be N,N,N-1-trimethyladamantammonium or N,N,N-dimethylethylcyclohexylammonium.

The SDA cation of the present invention is typically associated with anions which can be any anion that is not detrimental to the formation of the zeolite. Representative anions include elements from Group 17 of the Periodic Table (e.g., fluoride, chloride, bromide and iodide), hydroxide, acetate, sulfate, tetrafluoroborate, carboxylate, and the like. The SDA cation is selected from the group consisting of N,N-diethyl-cis 2,6-dimethylpiperidium, N,N-dimethyl-3,5-dimethylpiperidium, trimethyladamantylammonium, and 1,3-bis(1-adamantyl) imidazolium.

The crystals of the small pore zeolite catalyst can have a mean crystal size of about 0.1 μm to about 10 μm. Preferably the crystals of the small pore zeolite catalyst have a mean crystal size of about 0.5 μm to about 5 μm. Alternatively, the crystals of the small pore zeolite catalyst have a mean crystal size of about 0.2 μm to about 2 μm.

The crystal size is based on individual crystals (including twinned crystals) but does not include agglomerations of crystals. Crystal size is the length of longest diagonal of the three dimensional crystal. Direct measurement of the crystal size can be performed using microscopy methods, such as SEM and TEM. For example, measurement by SEM involves examining the morphology of materials at high magnifications (typically 1000× to 10,000×). The SEM method can be performed by distributing a representative portion of the zeolite powder on a suitable mount such that individual particles are reasonably evenly spread out across the field of view at 1000× to 10,000× magnification. From this population, a statistically significant sample of random individual crystals (e.g., 50-200) are examined and the longest diagonal of the individual crystals are measured and recorded. (Particles that are clearly large polycrystalline aggregates should not be included the measurements.) Based on these measurements, the arithmetic mean of the sample crystal sizes is calculated.

Particle size of an agglomeration of crystals can be determined in a similar manner except that instead of measuring the edge of a face of an individual crystal, the length of the longest side of an agglomeration is measured. Other techniques for determining mean particle size, such as laser diffraction and scattering can also be used.

As used herein, the term "mean" with respect to crystal or particle size is intended to represent the arithmetic mean of a statistically significant sample of the population. For example, a catalyst comprising molecular sieve crystals having a mean crystal size of about 0.5 μm to about 5.0 μm is catalyst having a population of the molecular sieve crystals, wherein a statistically significant sample of the population (e.g., 50 crystals) would produce an arithmetic mean within the range of about 0.5 μm to about 5.0 μm.

The framework zeolite catalyst crystals can have a mean particle size of about 0.5 μm to about 5 μm. Alternatively, the crystals of the small pore zeolite catalyst have a mean particle size of 0.2 μm to about 2 μm.

The at least one promoter metal containing zeolite can be the only promoter metal and aluminum source to form the aluminosilicate zeolite catalyst. Typically, the at least one promoter metal containing zeolite is also the only silica source to form the aluminosilicate zeolite catalyst.

The at least one promoter metal containing zeolite can comprise two or more promoter metals containing zeolites. Preferably the at least one promoter metal containing zeolite comprises two or more promoter metals containing zeolites having different silica-to-alumina molar ratios.

The synthesis gel of the methods described above can have one or more, two or more, three or more, four or more, five or more, or all six, of the following compositional molar ratios:

$SiO_2/Al_2O_3$ of about 28 to about 105;
$Na_2O/Al_2O_3$ of about 7 to about 23;
$MO/Al_2O_3$ of about 0.1 to about 5;
$SDA_2O/Al_2O_3$ of about 1.5 to about 9.5;
$H_2O/Al_2O_3$ of about 700 to about 3000;
$OH^-/SiO_2$ of about 0.6 to about 0.65, where MO is the oxide of the promoter metal and SDA is the template.

The promoter metal (M) is calculated in the form of MO (e.g., CuO, FeO, etc.). For example, $Fe_2O_3$ will be considered as 2FeO for the compositional molar ratio calculation purpose only (similarly, $Fe_3O_4$ will be considered as 3FeO).

To improve selectivity for the framework and/or to shorten the crystallization process, the reaction mixture can be seeded with the framework zeolite crystals. The framework zeolite crystals can also be allowed to nucleate spontaneously from the reaction mixture. Alternatively, the synthesis can be conducted in the absence of the seeded framework zeolite crystals.

The synthesis gel is heated to a temperature greater than 100° C., for example about 120 to about 180° C., or about 140 to about 160° C., for a period of time sufficient to form zeolite crystals. The hydrothermal crystallization process is typically conducted under pressure, such as in an autoclave, and is preferably under autogenous pressure. The reaction mixture can be stirred during crystal formation. The reaction time is typically about 2 to about 15 days, for example about 4 to about 8 days.

Another aspect of the present invention is directed to a method of synthesizing a metal promoted aluminosilicate zeolite catalyst having a small pore framework comprising the step of reacting a synthesis get comprising a promoter metal source, at least one zeolite, a structure directing agent, and an optional additional silica source at a temperature of at least 100° C. until crystals of the small pore framework zeolite catalyst form.

The method of synthesis can be performed in a single reaction vessel.

The descriptions of the optional additional silica source, the promoter metal and the SDA are the same as described above.

Typically, the promoter metal source does not act as a second SDA.

Alternatively, or in addition, the promoter metal source cannot contain organic molecules.

The promoter metal source can be an inorganic metal complex.

Examples of suitable promoter metal cation include, but are not limited to, $Cu(NH_3)_4^{2+}$.

The promoter metal cation of the present invention is typically associated with anions which can be any anion that is not detrimental to the formation of the zeolite catalyst. Representative anions include elements from Group 17 of the Periodic Table (e.g., fluoride, chloride, bromide and iodide), hydroxide, acetate, sulfate, tetrafluoroborate, carboxylate, and the like.

The at least one zeolite can also be the only aluminum source to form the aluminosilicate zeolite. Typically, the at least one zeolite is the only silica and aluminum source to form the aluminosilicate zeolite.

The at least one zeolite can comprise two or more zeolites. Typically, the two or more zeolites are zeolites Y having different silica-to-alumina molar ratios.

The framework zeolite crystals of the methods described above can be at least about 90% phase pure. Typically, the aluminosilicate zeolite catalyst contains at least about 95 percent, or even at least about 97 percent, of the framework.

The aluminosilicate zeolite catalyst can also be substantially free of other crystalline phases and typically it is not an intergrowth of two or more framework types. As used herein, the term "substantially free" means that the zeolite contains less than about 10, 8, 6, 4, 2, or 1 percent of an impurity having a different framework.

Examples of suitable small pore zeolites include, but are not limited to, AEI, CHA, AFX, EAB, KFI, LEV, RTH, SFW, and ERI. Preferably the small pore zeolite can be selected from the group consisting of AEI, CHA, AFX, EAB, KFI, and LEV. More preferably, the small pore zeolite is selected from the group consisting of AFX, AEI, and CHA. The small pore zeolite can be CHA. The small pore zeolite can be AEI. The small pore zeolite can be AFX.

The framework zeolite crystals can have an SAR of at least about 15, 20, 22, 25, or 30. Alternatively, the framework zeolite crystals have an SAR of about 15 to about 40, about 15 to about 35, or about 16 to about 30.

The framework zeolite crystals of the methods described above can be Cu-AFX, Preferably the Cu-AFX catalyst has an SAR of about 15 to about 40, more preferably about 16 to about 32. Typically, Cu is present in the small pore zeolite catalyst at a concentration of up to about 10, 5, or 2 weight percent (wt %) based on the total weight of Cu-AFX catalyst.

The crystals of the small pore zeolite catalyst can have a mean crystal size of about 0.1 μm to about 10 μm. Preferably, the crystals of the small pore zeolite catalyst have a mean crystal size of about 0.5 μm to about 5 μm. More preferably, the crystals of the small pore zeolite catalyst have a mean crystal size of about 0.5 μm to about 1 μm.

The synthesis gel of the methods of synthesis as described above can have one or more, two or more, three or more, four or more, five or more, or all six, of the following compositional molar ratios:

$SiO_2/Al_2O_3$ of about 35 to about 80;
$Na_2O/Al_2O_3$ of about 7 to about 20;
$MO/Al_2O_3$ of about 0.1 to about 5;
$SDA_2O/Al_2O_3$ of about 2 to about 9;
$H_2O/Al_2O_3$ of about 700 to about 3000;
$OH^-/SiO_2$ of about 0.6 to about 0.65, where MO and SDA are as defined herein.

To improve selectivity for the framework and/or to shorten the crystallization process, the reaction mixture can be seeded with the framework zeolite crystals. The framework zeolite crystals can also be allowed to nucleate spontaneously from the reaction mixture. Alternatively, the synthesis is conducted in the absence of the seeded framework zeolite crystals.

The synthesis gel is heated to a temperature greater than 100° C., for example about 120 to about 180° C., or about 140 to about 160° C., for a period of time sufficient to form zeolite crystals. The hydrothermal crystallization process is typically conducted under pressure, such as in an autoclave, and is preferably under autogenous pressure. The reaction mixture can be stirred during crystal formation. The reaction time is typically about 2 to about 15 days, for example about 4 to about 8 days.

The metal promoted zeolite catalyst composition, obtainable or obtained by the synthesis as described in the first two aspects, can further comprise at least one alkali or alkaline earth metal, wherein the alkali or alkaline earth metal(s) are disposed on or within the promoter metal containing zeolite catalyst. The alkali or alkaline earth metal can be selected from sodium, potassium, rubidium, cesium, magnesium, calcium, strontium, barium, or some combination thereof. As used here, the phrase "alkali or alkaline earth metal" does not mean the alkali metals and alkaline earth metals are used in the alternative, but instead that one or more alkali metals can be used alone or in combination with one or more alkaline earth metals and that one or more alkaline earth metals can be used alone or in combination with one or more alkali metals. Typically, alkali metals are preferred. Alternatively, alkaline earth metals are preferred. Preferred alkali or alkaline earth metals include calcium, potassium, and combinations thereof. The catalyst composition can be essentially free of magnesium and/or barium. Alternatively, the catalyst can be essentially free of any alkali or alkaline earth metal except calcium and potassium. The catalyst can be essentially free of any alkali or alkaline earth metal except calcium. The catalyst can be essentially free of any alkali or alkaline earth metal except potassium. As used herein, the term "essentially free" with respect to metal means that the material does not have an appreciable amount of the particular metal. That is, the particular metal is not present in an amount that would affect the basic physical and/or chemical properties of the material, particularly with respect to the material's capacity to selectively reduce or store $NO_x$.

The metal promoted zeolite catalyst composition, obtainable or obtained by the synthesis as described in the first two aspects, can also have a post-synthesis alkali/alkali-earth content of less than 3 weight percent, more preferably less than 1 weight percent, and even more preferably less than 0.1 weight percent. Here, post-synthesis alkali content refers to the amount of alkali/alkali-earth metal occurring in the zeolite as a result of synthesis (i.e., alkali/alkali-earth derived from the synthesis starting materials) and does not include alkali/alkali-earth metal added after synthesis.

The metal promoted zeolite catalysts of the present invention can also contain a relatively large amount of cerium (Ce). Typically, the cerium concentration in the catalyst material is present in a concentration of at least about 1 weight percent, based on the total weight of the zeolite. Examples of preferred concentrations include at least about 2.5 weight percent, at least about 5 weight percent, at least about 8 weight percent, at least about 10 weight percent, about 1.35 to about 13.5 weight percent, about 2.7 to about 13.5 weight percent, about 2.7 to about 8.1 weight percent, about 2 to about 4 weight percent, about 2 to about 9.5 weight percent, and about 5 to about 9.5 weight percent, based on the total weight of the zeolite.

Typically, the cerium concentration in the catalyst material is about 50 to about 550 $g/ft^3$, from about 75 to about 350 $g/ft^3$, from about 100 to about 300 $g/ft^3$, and from about 100 to about 250 $g/ft^3$. Alternatively, the concentrations ranges of Ce can be above 100 $g/ft^3$, above 200 $g/ft^3$, above 300 $g/ft^3$, above 400 $g/ft^3$, or above 500 $g/ft^3$.

Certain aspects of the invention provide a catalytic washcoat. The washcoat comprising the small pore (e.g., AEI, AFX, and CHA) zeolite catalyst described herein is preferably a solution, suspension, or slurry. Suitable coatings include surface coatings, coatings that penetrate a portion of the substrate, coatings that permeate the substrate, or some combination thereof.

In general, the production of an extruded solid body containing the metal promoted zeolite catalyst involves blending the small pore (e.g., AEI, AFX, and CHA) zeolite and the promoter metal (either separately or together as a metal-exchanged zeolite), a binder, an optional organic viscosity-enhancing compound into a homogeneous paste which is then added to a binder/matrix component or a precursor thereof and optionally one or more of stabilized ceria, and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body. A metal-promoted small pore (e.g., AEI, AFX, and CHA) zeolite catalyst can also be washcoated or otherwise applied to the extruded solid body as one or more sub-layers that reside on the surface or penetrate wholly or partly into the extruded solid body. Alternatively, a metal-promoted small pore (e.g., AEI, AFX, and CHA) zeolite can be added to the paste prior to extrusion.

Extruded solid bodies containing metal-promoted small pore (e.g. AEI, AFX, and CHA) zeolites according to the present invention generally comprise a unitary structure in the form of a honeycomb having uniform-sized and parallel channels extending from a first end to a second end thereof. Channel walls defining the channels are porous. Typically, an external "skin" surrounds a plurality of the channels of the extruded solid body. The extruded solid body can be formed from any desired cross section, such as circular, square or oval. Individual channels in the plurality of channels can be square, triangular, hexagonal, circular etc. Channels at a first, upstream end can be blocked, e.g. with a suitable ceramic cement, and channels not blocked at the first, upstream end can also be blocked at a second, downstream end to form a wall-flow filter. Typically, the arrangement of the blocked channels at the first, upstream end resembles a checker-board with a similar arrangement of blocked and open downstream channel ends.

The binder/matrix component is preferably selected from the group consisting of cordierite, nitrides, carbides, borides, intermetallics, lithium aluminosilicate, a spinel, an optionally doped alumina, a silica source, titania, zirconia, titania-zirconia, zircon and mixtures of any two or more thereof. The paste can optionally contain reinforcing inorganic fibers selected from the group consisting of carbon fibers, glass fibers, metal fibers, boron fibers, alumina fibers, silica fibers, silica-alumina fibers, silicon carbide fibers, potassium titanate fibers, aluminum borate fibers and ceramic fibers.

The alumina binder/matrix component is preferably gamma alumina, but can be any other transition alumina, i.e., alpha alumina, beta alumina, chi alumina, eta alumina, rho alumina, kappa alumina, theta alumina, delta alumina, lanthanum beta alumina and mixtures of any two or more such transition aluminas. It is preferred that the alumina is doped with at least one non-aluminum element to increase the thermal stability of the alumina. Suitable alumina dopants include silicon, zirconium, barium, lanthanides and mixtures of any two or more thereof. Suitable lanthanide dopants include La, Ce, Nd, Pr, Gd and mixtures of any two or more thereof.

Sources of silica can include a silica sol, quartz, fused or amorphous silica, sodium silicate, an amorphous aluminosilicate, an alkoxysilane, a silicone resin binder such as methylphenyl silicone resin, a clay, talc or a mixture of any two or more thereof. Of this list, the silica can be $SiO_2$ as such, feldspar, mullite, silica-alumina, silica-magnesia, silica-zirconia, silica-thoria, silica-berylia, silica-titania, ternary silica-alumina-zirconia, ternary silica-alumina-magnesia, ternary-silica-magnesia-zirconia, ternary silica-alumina-thoria and mixtures of any two or more thereof.

Preferably, the metal-promoted small pore (e.g., AEI, AFX, and CHA) zeolite is dispersed throughout, and preferably evenly throughout, the entire extruded catalyst body.

Where any of the above extruded solid bodies are made into a wall-flow filter, the porosity of the wall-flow filter can be from 30-80%, such as from 40-70%. Porosity and pore volume can be measured e.g. using mercury intrusion porosimetry.

The metal-promoted small pore (e.g., AEI, AFX, and CHA) catalyst described herein can promote the reaction of a reductant, preferably ammonia, with nitrogen oxides to selectively form elemental nitrogen ($N_2$) and water ($H_2O$). Typically, the catalyst can be formulated to favor the reduction of nitrogen oxides with a reductant (i.e., an SCR catalyst). Examples of such reductants include hydrocarbons (e.g., $C_3$-$C_6$ hydrocarbons) and nitrogenous reductants such as ammonia and ammonia hydrazine or any suitable ammonia precursor, such as urea (($NH_2$)$_2$CO), ammonium carbonate, ammonium carbamate, ammonium hydrogen carbonate or ammonium formate.

The metal-promoted small pore (e.g., AEI, AFX, and CHA) catalyst described herein can also promote the oxidation of ammonia. The catalyst can be formulated to favor the oxidation of ammonia with oxygen, particularly a concentrations of ammonia typically encountered downstream of an SCR catalyst (e.g., ammonia oxidation (AMOX) catalyst, such as an ammonia slip catalyst (ASC)). Typically, the metal-promoted small pore (e.g., AFX) zeolite catalyst is disposed as a top layer over an oxidative under-layer, wherein the under-layer comprises a platinum group metal (PGM) catalyst or a non-PGM catalyst. Preferably, the catalyst component in the underlayer is disposed on a high surface area support, including but not limited to alumina.

SCR and AMOX operations can be performed in series, wherein both processes utilize a catalyst comprising the metal-promoted small pore (e.g., AEI, AFX, and CHA) zeolite described herein, and wherein the SCR process occurs upstream of the AMOX process. For example, an SCR formulation of the catalyst can be disposed on the inlet side of a filter and an AMOX formulation of the catalyst can be disposed on the outlet side of the filter.

Accordingly, provided is a method for the reduction of $NO_x$ compounds or oxidation of $NH_3$ in a gas, which comprises contacting the gas with a catalyst composition described herein for the catalytic reduction of $NO_x$ compounds for a time sufficient to reduce the level of $NO_x$ compounds and/or $NH_3$ in the gas. A catalyst article having an ammonia slip catalyst can be disposed downstream of a selective catalytic reduction (SCR) catalyst. The ammonia slip catalyst can oxidize at least a portion of any nitrogenous reductant that is not consumed by the selective catalytic reduction process. The ammonia slip catalyst can be disposed on the outlet side of a wall flow filter and an SCR catalyst is disposed on the upstream side of a filter. Alternatively, the ammonia slip catalyst can be disposed on the downstream end of a flow-through substrate and an SCR catalyst can be disposed on the upstream end of the flow-through substrate. The ammonia slip catalyst and SCR catalyst can be disposed on the same substrate (brick) or separate bricks within the exhaust system. These separate bricks can be adjacent to, and in contact with each other, or separated by a specific distance, provided that they are in fluid communication with each other and provided that the SCR catalyst brick is disposed upstream of the ammonia slip catalyst brick.

The SCR and/or AMOX process can be performed at a temperature of at least 100° C. Typically, the process(es) occur at a temperature from about 150° C. to about 750° C., preferably about 175 to about 550° C., more preferably from about 175 to about 400° C. Alternatively, the temperature range is about 450 to about 900° C., preferably about 500 to about 750° C., about 500 to about 650° C., about 450 to about 550° C., or about 650 to about 850° C. Temperatures greater than about 450° C. are particularly useful for treating exhaust gases from a heavy and light duty diesel engine that is equipped with an exhaust system comprising (optionally catalyzed) diesel particulate filters which are regenerated actively, e.g. by injecting hydrocarbon into the exhaust system upstream of the filter, wherein the zeolite catalyst for use in the present invention is located downstream of the filter.

According to another aspect of the invention, provided is a method for the reduction of $NO_X$ compounds and/or oxidation of $NH_3$ in an exhaust gas, which comprises contacting the exhaust gas with a catalyst described herein in the presence of a reducing agent for a time sufficient to reduce the level of $NO_X$ compounds in the gas. These methods can further comprise one or more of the following steps: (a) accumulating and/or combusting soot that is in contact with the inlet of a catalytic filter; (b) introducing a nitrogenous reducing agent into the exhaust gas stream prior to contacting the catalyst in an SCR filter, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, can be used to oxidize particulate matter in particulate filter; and/or reduce the particulate matter (PM) in the exhaust gas; and (e) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

All or at least a portion of the nitrogen-based reductant, particularly $NH_3$, for consumption in the SCR process can be supplied by a $NO_X$ adsorber catalyst (NAC), a lean $NO_X$ trap (LNT), or a $NO_X$ storage/reduction catalyst (NSRC), disposed upstream of the SCR catalyst, e.g., an SCR catalyst of the present invention disposed on a wall-flow filter. NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 g/ft$^3$, such as about 20 to about 60 g/ft$^3$. Alternatively, the precious metal of the catalyst is characterized by the average concentration which can be from about 40 to about 100 grams/ft$^3$.

Under certain conditions, during the periodically rich regeneration events, $NH_3$ can be generated over a $NO_x$ adsorber catalyst. The SCR catalyst downstream of the $NO_x$ adsorber catalyst can improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

The method for treating exhaust gas as described herein can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. Typically, the method is used for treating exhaust gas from a vehicular lean burn internal combustion engine, such as a diesel engine, a lean-burn gasoline engine or an engine powered by liquid petroleum gas or natural gas.

In certain aspects, the invention is a system for treating exhaust gas generated by combustion process, such as from an internal combustion engine (whether mobile or stationary), a gas turbine, coal or oil fired power plants, and the like. Such systems include a catalytic article comprising the metal-promoted small pore (e.g., AEI, AFX, and CHA) zeolite described herein and at least one additional component for treating the exhaust gas, wherein the catalytic article and at least one additional component are designed to function as a coherent unit.

The system can comprise a catalytic article comprising a metal-promoted small pore (e.g., AEI, AFX, and CHA) zeolite described herein, a conduit for directing a flowing exhaust gas, a source of nitrogenous reductant disposed upstream of the catalytic article. The system can include a controller for the metering the nitrogenous reductant into the flowing exhaust gas only when it is determined that the zeolite catalyst is capable of catalyzing $NO_x$ reduction at or above a desired efficiency, such as at above 100° C., above 150° C. or above 175° C. The metering of the nitrogenous reductant can be arranged such that 60% to 200% of theoretical ammonia is present in exhaust gas entering the SCR catalyst calculated at 1:1 $NH_3$/NO and 4:3 $NH_3/NO_2$.

The system can also comprise an oxidation catalyst (e.g., a diesel oxidation catalyst (DOC)) for oxidizing nitrogen monoxide in the exhaust gas to nitrogen dioxide can be located upstream of a point of metering the nitrogenous reductant into the exhaust gas. The oxidation catalyst can be adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. Preferably, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

A suitable filter substrate can be located between the oxidation catalyst and the SCR catalyst. Filter substrates can be selected from any of those mentioned above, e.g. wall flow filters. Where the filter is catalyzed, e.g. with an oxidation catalyst of the kind discussed above, preferably the point of metering nitrogenous reductant is located between the filter and the zeolite catalyst. Alternatively, if the filter is un-catalyzed, the means for metering nitrogenous reductant can be located between the oxidation catalyst and the filter.

Although the description above contains many specifics, these are merely provided to illustrate the invention and should not be constructed as limitations of the invention's scope. It should be also noted that many specifics could be combined in various ways in a single or multiple embodiments. Thus it will be apparent to those skilled in the art that various modifications and variations can be made in the processes, catalysts, and methods of the present invention without departing from the spirit or scope of the invention.

EXAMPLES

Materials produced in the examples described below were characterized by one or more of the following analytic methods. Powder X-ray diffraction (PXRD) patterns were collected on a X'pert (Philips) or Bruker D8 powder diffractometer using a CuKα radiation (40-45 kV, 40 mA) at a step size of 0.04° and a 1 s per step between 5° and 40° (2θ). Scanning electron microscopy (SEM) images and chemical compositions by energy-dispersive X-ray spectroscopy (EDX) were obtained on a JEML JSM7400F and Auriga 60 CrossBeam (FIB/FE-SEM) microscopes, operating at an acceleration voltage of 1.5-3 keV, and a current of 10 μA. The micropore volume and surface area were measured using $N_2$ at 77 K on a 3Flex surface characterization analyzer (Micrometrics).

Reagents: Sodium Banco "N" silicate (~28 wt % $SiO_2$, 8.9 wt % $Na_2O$, PQ corporation), Zeolite Y (CBV712 (SAR~12), CBV720 (SAR~30-32) from Zeolyst), DI water, $Cu(CH_3COO)_2 \cdot H_2O$, isopropylamine (99%, Sigma), NaOH 1N (diluted from NaOH 99% Fisher Scientific), N,N-diethyl-cis 2,6-dimethylpiperidium hydroxide (2,6-DMP-OH, 22% wt), trimethyladamantylammonium hydroxide (TMAda-OH, Sachem, 25% wt), 1,3-bis(1-adamantyl) imidazolium (BAI-OH, 20%) hydroxide, $CuSO_4$ (99% wt, Sigma), aqueous $NH_4OH$ (30% wt, Sigma).

Example 1: Synthesis of Copper Containing Faujasites

Copper Containing Faujasites, 1.5-4% wt Cu-CBV712 or 1.5-3.5% wt Cu-CBV720 were obtained by ion-exchange and impregnation methods of $Cu(CH_3COO)_2$ solution with CBV712 or CBV720 at 60-80° C.

Example 2: Synthesis of Cu-AEI Via Copper Containing Faujasites 2 mmol of 2,6-DMP-OH template (1.71 g) molecule hydroxide was mixed with 0.2 g of 1 N NaOH and 4.1 g of water. Then, 2.5 g of Banco "N" silicate was added to the mixture, which was stirred for about 5 minutes. Finally, 0.25 g of copper-exchanged zeolite Y (Cu-CBV712, prepared according the method described in Example 1) as an aluminum and copper source was added to the mixture under stirring for another 5 minutes. The mixture was then heated at 155° C. under rotation (45 rpm) for 4 days. The as-made product, obtained from the mixture by filtering, was calcined at 580° C./8 hours in air with ramping rate of 3° C./min.

Figure 1:
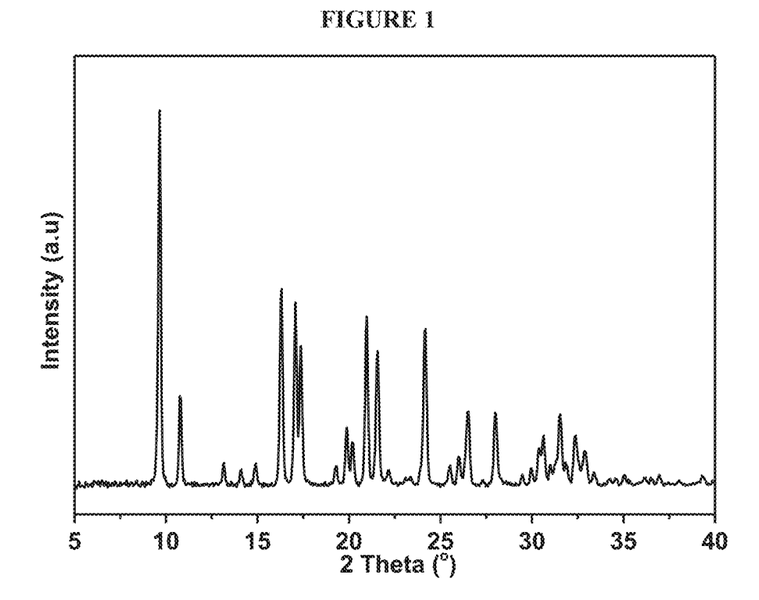
FIG. 1 is an XRD pattern of Cu-AEI prepared using Cu exchanged CBV712 as copper and aluminum sources (Example 2).
Figure 2:
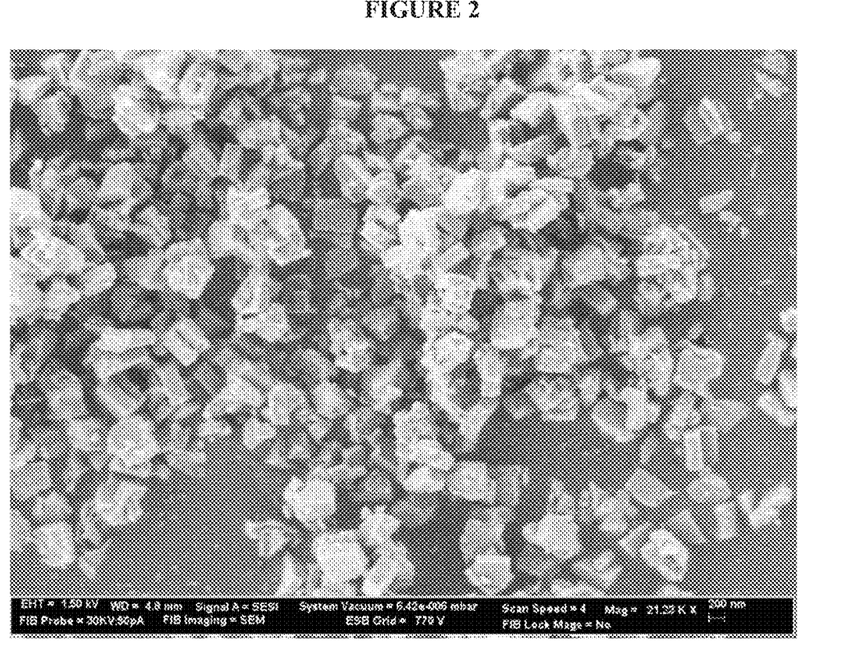
FIG. 2 is an SEM image of Cu-AEI prepared using Cu exchanged CBV712 as copper and aluminum sources (Example 2).

Samples of the dried product were analysed by XRD, SEM, EDX, and $N_2$ adsorption as described above. Analysis of the as-made product by powder XRD (FIG. 1) indicated that the product contained an AEI structure. An SEM image of the as-made sample (FIG. 2) showed that the AEI structure had a rectangular morphology. $N_2$ adsorption measurements of the calcined product showed that the product had a BET surfaces area of ~650 $m^2/g$ and a pore volume of ~0.25 $cm^3/g$. The calcined product had an SAR of about 20.

Example 3: Synthesis of Cu-AFX Via Copper Containing Faujasites 1.9 mmol of the BAI template (3.363 g) molecule hydroxide was mixed with 0.2 g of 1 N NaOH and the mass was brought to 6 g by adding water. Then, 2.5 g of Banco "N" silicate was added and the mixture was stirred for about 5 minutes. Finally, 0.25 g of copper-exchanged zeolite Y (Cu-CBV712, prepared according to the method described in Example 1) as an aluminum and copper source was added to the mixture under stirring for another 5 minutes. The mixture was then heated at 155° C. under rotation (45 rpm) for 4 days. The as-made product, obtained from the mixture by filtering, was calcined at 580° C./8 hours in air with ramping rate of 3° C./min.

Figure 3:
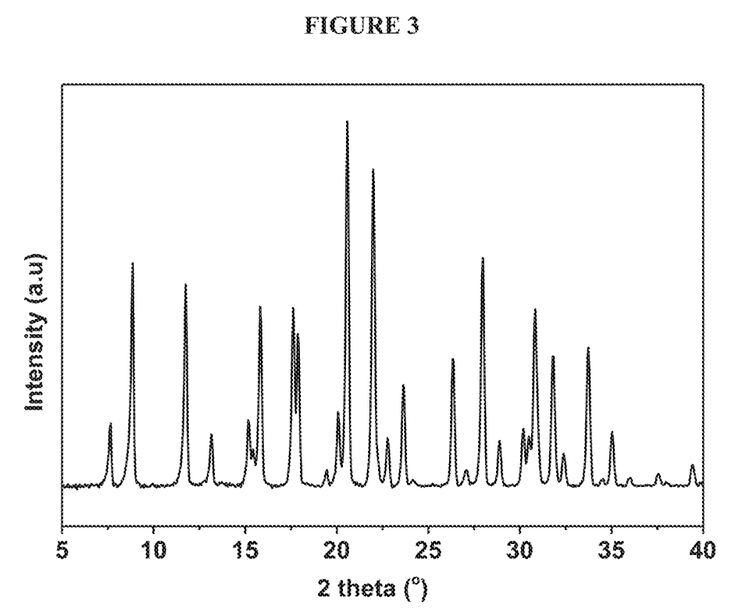
FIG. 3 is an XRD pattern of Cu-MX prepared using Cu exchanged CBV712 as copper and aluminum sources (Example 3).

Samples of the dried product were analysed by XRD, EDX, and $N_2$ adsorption as described above. Analysis of the as-made product by powder XRD (FIG. 3) indicated that the product contained an AFX structure. The calcined product had a BET surfaces area of ~650 $m^2/g$ and a pore volume of ~0.25 $cm^3/g$. The calcined product had an SAR of about 22.

Example 4: Synthesis of Cu-CHA Via Copper Containing Faujasites 2 mmol of the TMAda template (1.69 g) molecule hydroxide was mixed with 0.2 g of 1 N NaOH and 4.4 g of water. Then, 2.5 g of Banco "N" silicate was added and the mixture was stirred for about 5 minutes. Finally, 0.25 g of copper-exchanged zeolite Y (Cu-CBV712, prepared according the method described in Example 1) as an aluminum and copper source was added to the mixture under stirring for another 5 minutes. The mixture was then heated at 155° C. under rotation (45 rpm) for 4 days. The as-made product, obtained from the mixture by filtering, was calcined at 580° C./8 hours in air with ramping rate of 3° C./min.

Figure 4:
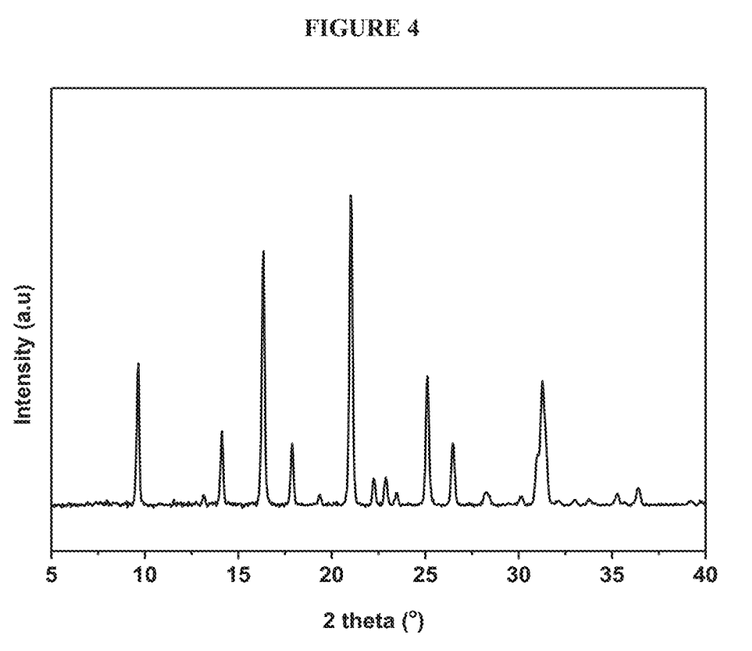
FIG. 4 is an XRD pattern of Cu-CHA prepared using Cu exchanged CBV712 as copper and aluminum sources (Example 4).

Samples of the dried product were analysed by XRD, EDX, and $N_2$ adsorption as described above. Analysis of the as-made product by powder XRD (FIG. 4) indicated that the product contained a CHA structure. The calcined product had a BET surfaces area of ~650 $m^2/g$ and a pore volume of ~0.25 $cm^3/g$. The calcined product had an SAR of about 20.

Example 5: Synthesis of Cu-AFX Via Copper Complex and Faujasites in a Single Reaction Vessel Cu-Complex synthesis: $Cu(NH_3)_4SO_4$ was prepared by mixing 7.98 g of $CuSO_4$ with 34 g of $NH_4OH$ 30% wt and 18.6 g of $H_2O$.

7.6 g of the BAI template molecule hydroxide was mixed with 0.5 g of 1 N NaOH and 3.68 g of water. Then, 5.2 g of Banco "N" silicate was added and the mixture was stirred for about 5 minutes. Next, 0.78 g of $Cu(NH_3)_4SO_4$ solution (prepared as described above) was added into the gel mixture under vigorous stirring. Finally, 0.51 g of zeolite Y (CBV 712) as an aluminum source was added to the mixture under stirring for another 5 minutes. The mixture was then heated at 155° C. under rotation (45 rpm) for 4 days. The as-made product, obtained from the mixture by filtering, was calcined at 580° C./8 hours in air with ramping rate of 3° C./min.

Figure 5:
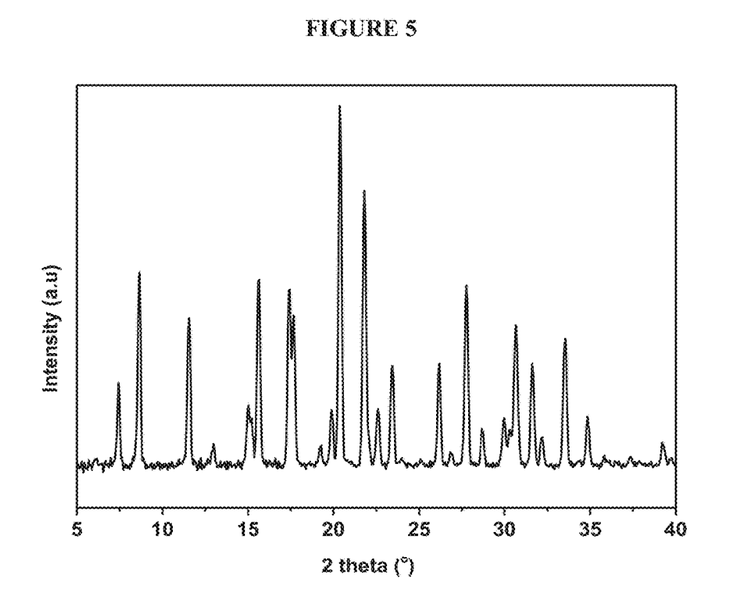
FIG. 5 is an XRD pattern of Cu-AFX prepared using Cu(NH$_3$)$_4^{2+}$ and CBV712 (NH$_4$-form) as copper and aluminum sources, respectively (Example 5).

Samples of the dried product were analysed by XRD, EDX, and $N_2$ adsorption as described above. Analysis of the as-made product by powder XRD (FIG. 5) indicated that the product contained an AFX structure. The calcined product had a BET surfaces area of ~620 $m^2/g$ and a pore volume of ~0.24 $cm^3/g$. The calcined product had an SAR of about 20.

Example 6: SCR Testing of Cu-AEI from Example 2

Testing Conditions:
SV=90K, 500 ppm $NH_3$, 500 ppm NO, 4.6% $H_2O$, 14% $O_2$, 5% $CO_2$ in $N_2$, ramp 5° C./min.

Procedures:
Catalyst was initially exposed to full gas mixture with $NH_3$ for 10 min at 150° C. $NH_3$ was switched on and the catalyst is stabilized for 30 min to saturate. Catalyst was then evaluated during a 5° C./min ramp from 150 to 500° C. Catalyst was evaluated at steady state at 500° C. then cooled and evaluated again at steady state at 250° C.

Figure 6:
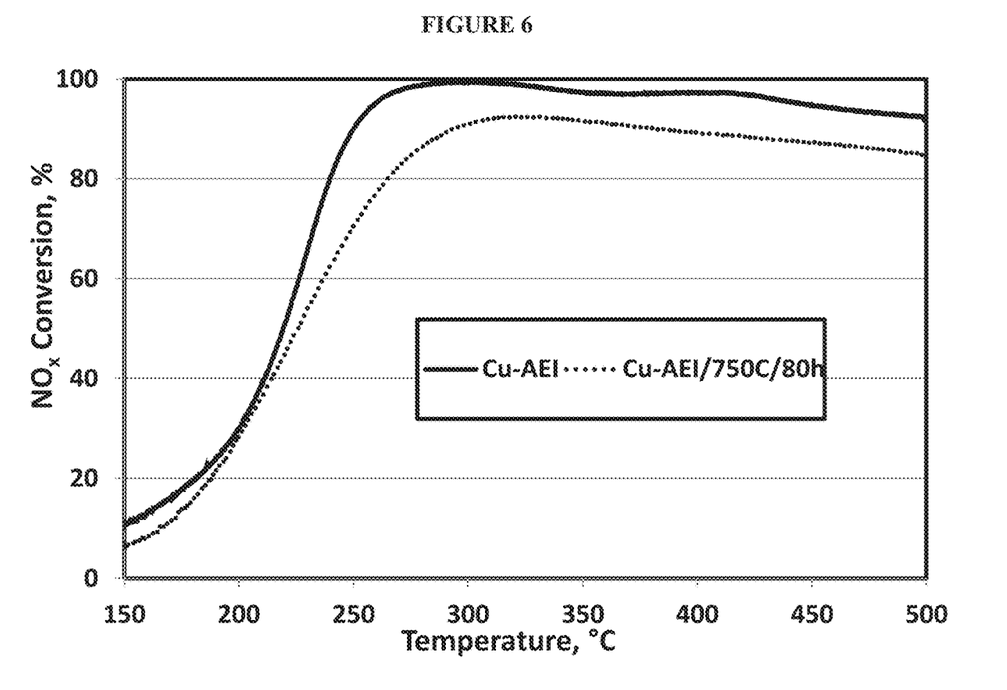
FIG. 6 is SCR activity testing of fresh and aged Cu-AEI prepared according to Example 2 of the present invention.
Figure 7:
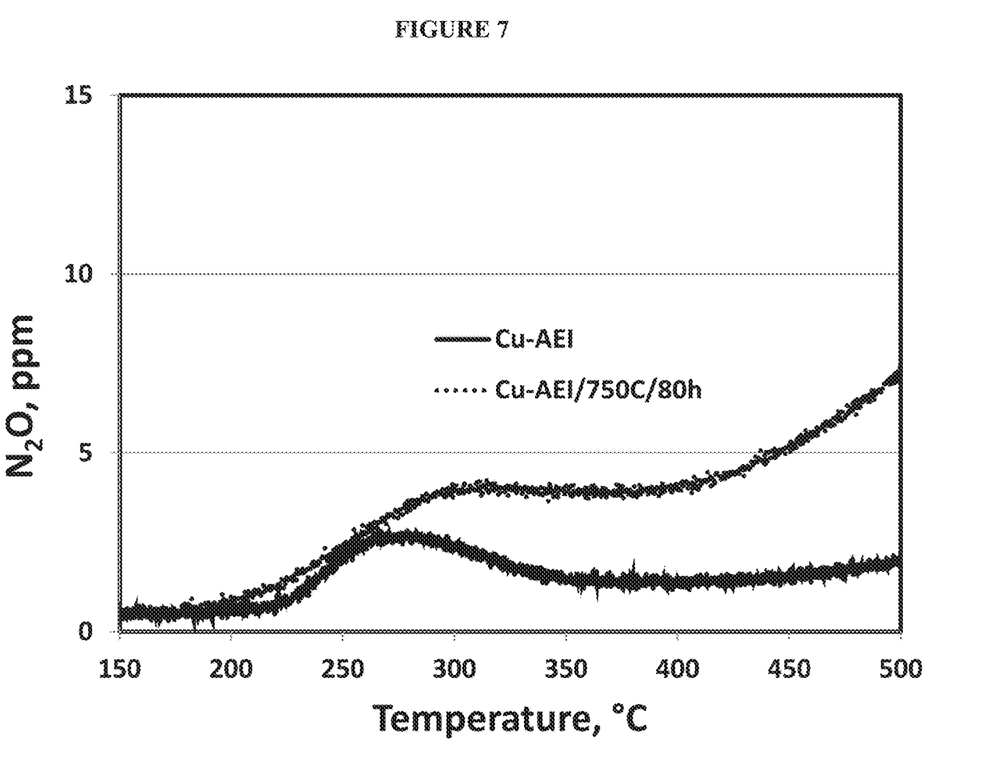
FIG. 7 is the N$_2$O selectivity of fresh and aged Cu-AEI prepared according to Example 2 of the present invention.

As shown in FIG. 6, the SCR activities of fresh and aged (750° C./80 h/10% $H_2O$ in air) Cu-AEI prepare in Example 2 indicated very good hydrothermal durability as evidenced by the small drop in NOx conversion after aging. In addition, both fresh and aged Cu-AEI prepared in Example 2 demonstrated low selectivity to $N_2O$ formation (FIG. 7).

The above examples are set forth to aid in the understanding of the invention, and are not intended and should not be construed to limit in any way the invention set forth in the claims which follow hereafter. Although illustrated and herein described with reference to certain specific embodiments, the present invention is nevertheless not intended to be limited to the details shown, but various modifications may be made therein without departing from the spirit of the invention.

The invention claimed is:

1. A method of synthesizing a metal promoted aluminosilicate zeolite catalyst having a small pore framework comprising the step of reacting a synthesis gel comprising at least one promoter metal containing zeolite, a structure directing agent (SDA) and an optional additional silica source at a temperature of at least about 100° C. until crystals of the small pore framework zeolite catalyst form;
    wherein the zeolite catalyst crystals have a mean crystal size of about 0.1 μm to about 10 μm; and
    wherein the promoter metal is copper.

2. The method of claim 1, wherein the framework zeolite catalyst crystals are at least about 90% phase pure.

3. The method of claim 1, wherein the framework zeolite crystals have a silica-to-alumina mole ratio (SAR) of at least about 15.

4. The method of claim 1, wherein the framework is selected from the group consisting of AEI, AFX, CHA, EAB, ERI, KFI, LEV, LTA, RTH, and SFW.

5. The method of claim 1, wherein the SDA comprises a cation selected from the group consisting of N,N-diethyl-cis 2,6-dimethylpiperidium, N,N-dimethyl-3,5-dimethylpiperidium, trimethyladamantylammonium, N,N,N-dimethylethylcyclohexylammonium, and 1,3-bis(1-adamantyl) imidazolium.

6. The method of claim 1, wherein the at least one promoter metal containing zeolite is the only promoter metal and aluminum source to form the aluminosilicate zeolite catalyst.

7. The method of claim 1, wherein the at least one promoter metal containing zeolite is the only silica source to form the aluminosilicate zeolite catalyst.

8. The method of claim 1, wherein the promoter metal containing zeolite is promoter metal containing zeolite Y.

9. The method of claim 8, wherein the promoter metal containing zeolite Y has an SAR of about 5 to about 60.

10. The method of claim 1 wherein the at least one promoter metal containing zeolite comprises two or more promoter metal containing zeolites.

11. The method of claim 1, wherein the at least one promoter metal containing zeolite comprises two or more promoter metal containing zeolites Y.

12. The method of claim 1, wherein the synthesis gel has one or more of the following compositional molar ratios:
$SiO_2/Al_2O_3$ of about 28 to about 105;
$Na_2O/Al_2O_3$ of about 7 to about 23;
$MO/Al_2O_3$ of about 0.1 to about 5;
$SDA_2O/Al_2O_3$ of about 1.5 to about 9.5;
$H_2O/Al_2O_3$ of about 700 to about 2000; and
$OH/SiO_2$ of about 0.6 to about 0.65;
where MO is an oxide of the promoter metal.

13. The method of claim 1, wherein the reacting step is performed at a temperature of about 120 to about 180° C. for about 2 to about 15 days.

* * * * *